United States Patent
Lu et al.

(10) Patent No.: US 11,706,728 B2
(45) Date of Patent: *Jul. 18, 2023

(54) RELAY SYSTEM SYNCHRONIZATION METHOD AND APPARATUS, AND COMPUTER DEVICE AND STORAGE MEDIUM

(71) Applicant: GUANGDONG OPPO MOBILE TELECOMMUNICATIONS CORP., LTD., Guangdong (CN)

(72) Inventors: Qianxi Lu, Guangdong (CN); Huei-Ming Lin, South Yarra (AU)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/655,836

(22) Filed: Mar. 22, 2022

(65) Prior Publication Data

US 2022/0217667 A1    Jul. 7, 2022

Related U.S. Application Data

(63) Continuation of application No. 17/088,523, filed on Nov. 3, 2020, now Pat. No. 11,317,368, which is a
(Continued)

(51) Int. Cl.
*H04W 56/00* (2009.01)
*H04B 7/155* (2006.01)
*H04W 84/04* (2009.01)

(52) U.S. Cl.
CPC ........ *H04W 56/0015* (2013.01); *H04B 7/155* (2013.01); *H04W 84/047* (2013.01)

(58) Field of Classification Search
CPC ........... H04W 56/0015; H04W 84/047; H04W 56/0045; H04W 56/004; H04W 56/001;
(Continued)

(56) References Cited

U.S. PATENT DOCUMENTS 10,687,345 B2 *  6/2020  Park ...................... H04W 72/14
11,317,368 B2 *  4/2022  Lu ...................... H04W 56/0015
(Continued)

FOREIGN PATENT DOCUMENTS

CN    101958766 A    1/2011
CN    101964699 A    2/2011
(Continued)

OTHER PUBLICATIONS

EPO, Extended European Search Report for European Patent Application No. 18917818.9. dated Apr. 22, 2021. 11 pages.
(Continued)

*Primary Examiner* — Afshawn M Towfighi
(74) *Attorney, Agent, or Firm* — Perkins Coie LLP (57) ABSTRACT

Disclosed are a relay system synchronization method and apparatus, and a computer device and a storage medium. The method may comprise: a relay node determining a first slot boundary; the relay node sending downlink data to a child node by means of time alignment between a second slot boundary of the downlink data sent to the child node and the first slot boundary; in addition, the relay node determining a first timing advance at least according to the following information: a second timing advance for the relay node to send uplink data to a parent node and the transmission delay between the relay node and the child node; and the relay node sending the first timing advance to the child node, wherein the first timing advance is used for the child node to determine the sending time for sending the uplink data to the relay node.

11 Claims, 5 Drawing Sheets

Related U.S. Application Data continuation of application No. PCT/CN2018/086492, filed on May 11, 2018.

(58) Field of Classification Search
CPC ............... H04W 56/0005; H04B 7/155; H04B 7/15528
See application file for complete search history.

(56) References Cited

U.S. PATENT DOCUMENTS

| | | | |
|---|---|---|---|
| 2010/0142511 A1 | 6/2010 | Beer-gingold et al. | |
| 2011/0176475 A1* | 7/2011 | Youn | H04B 7/2606 370/315 |
| 2012/0063492 A1* | 3/2012 | Palanki | H04W 56/001 375/211 |
| 2013/0223330 A1* | 8/2013 | Medbo | H04B 7/155 370/315 |
| 2014/0269455 A1* | 9/2014 | Kim | H04W 48/12 370/280 |
| 2015/0063344 A1* | 3/2015 | Chen | H04W 56/0015 370/350 |
| 2015/0207614 A1* | 7/2015 | Das | H04L 5/0005 370/350 |
| 2017/0265167 A1* | 9/2017 | Guo | H04W 72/042 |
| 2020/0383073 A1* | 12/2020 | Liu | H04J 3/0673 |
| 2021/0105731 A1* | 4/2021 | Lin | H04W 72/1268 |

FOREIGN PATENT DOCUMENTS

| | | |
|---|---|---|
| CN | 102905361 A | 1/2013 |
| CN | 103098528 A | 5/2013 |
| CN | 104704893 A | 6/2015 |
| CN | 105007617 A | 10/2015 |
| CN | 107888529 A | 4/2018 |
| JP | 2010080991 A | 4/2010 |
| JP | 2011142593 A | 7/2011 |
| JP | 2011182475 A | 9/2011 |
| JP | 2012518325 A | 8/2012 |
| JP | 2012523197 A | 9/2012 |
| JP | 2012524433 A | 10/2012 |
| JP | 2013542639 A | 11/2013 |
| KR | 20080038494 A | 5/2008 |
| KR | 20120072308 A | 7/2012 |
| WO | 2012036787 A2 | 3/2012 |

OTHER PUBLICATIONS

Examination Report for Indian Application No. 202027048000 dated Dec. 8, 2021. 7 pages with English translation.
Examination Report No. 2 for Australian Application No. 2018422635 dated Nov. 2, 2021. 3 pages.
International Search Report dated Feb. 14, 2019 of PCT/CN2018/086492 (4 pages).
IPA, Examination Report No. 1 for Australian Patent Application No. 2018422635. dated Jun. 9, 2021. 4 pages.
Non-Final Office Action dated Sep. 17, 2021 of U.S. Appl. No. 17/088,523, filed Nov. 3, 2020.
Notice of Allowability dated Mar. 10, 2022 of U.S. Appl. No. 17/088,523, filed Nov. 3, 2020.
Notice of Allowance dated Jan. 19, 2022 of U.S. Appl. No. 17/088,523, filed Nov. 3, 2020.
Notice of Reasons for Refusal for Japanese Application No. 2020-561871 dated Dec. 17, 2021. 8 pages with English translation.
Notification of Reason for Refusal for Korean Application No. 10-2020-7032330 dated Sep. 2, 2021. 12 pages with English translation.
Notice of Allowance dated Mar. 7, 2022 of Korean Patent Application No. 10-2020-7032330. 3 pages with English translation.
Decision to Grant of the Japanese application No. 2020-561871, dated Aug. 2, 2022. 5 pages with English Translation.
First Office Action of the Chinese application No. 201880088454 5, dated May 16, 2022. 14 pages with English Translation.

* cited by examiner

RELAY SYSTEM SYNCHRONIZATION METHOD AND APPARATUS, AND COMPUTER DEVICE AND STORAGE MEDIUM

CROSS-REFERENCE TO RELATED APPLICATION

The present application is a continuation application of the U.S. application Ser. No. 17/088,523 filed on Nov. 3, 2020, which is a continuation application of International Application No. PCT/CN2018/086492 filed on May 11, 2018. The entire disclosures of both of which are hereby incorporated by reference.

TECHNICAL FIELD

The disclosure relates to a network technology, in particular to a synchronization method, apparatus for a relay system, a computer device and a storage medium.

BACKGROUND

In Long Term Evolution (LTE) system, backhaul links between a base station and another base station and between a base station and a core network adopt wired connections, which brings greater deployment difficulty and higher network distribution cost to operators.

In order to solve the above problems, $3^{rd}$ generation partnership project (3GPP) initiates research on a wireless relay technology in the standardization phase of Long Term Evolution-Advanced (LTE-A) to provide a solution of wireless backhaul link.

A Relay Node (RN) is wirelessly connected to a home cell to which the RN belongs, the home cell is called a Donor cell, and a home base station of the RN is called a Donor eNB, i.e., a DeNB.

Figure 1:
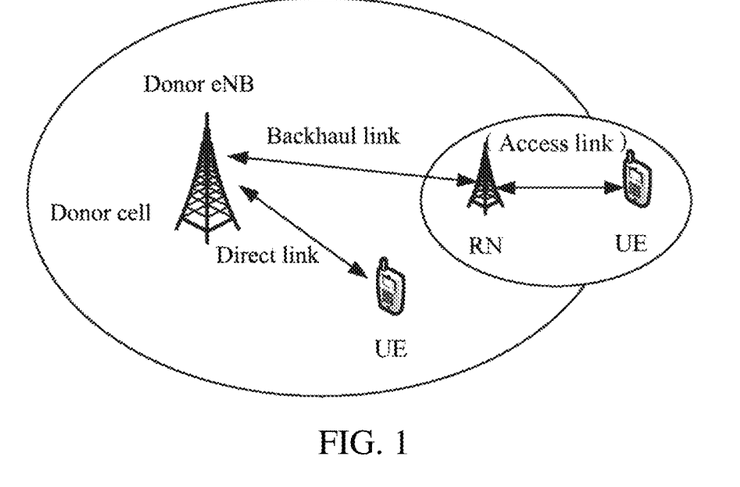
FIG. 1 is a schematic diagram of structure of an existing network in which an RN is introduced.

FIG. 1 is a schematic diagram of structure of an existing network in which an RN is introduced. As shown in FIG. 1, there are three wireless links: a backhaul link between an RN and a DeNB, an access link between a user equipment (UE) and an RN, and a direct link between a UE and an eNB.

Figure 2:
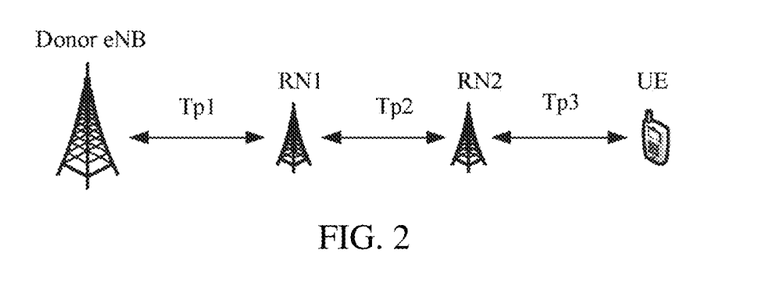
FIG. 2 is a schematic diagram of an existing relay system supporting multiple hops.

In a relay system, an upper level node of a node is referred to a parent node of the node, and a next level is referred to a child node of the node. As shown in FIG. 1, for the RN, the DeNB is a parent node of the RN and the UE is a child node the RN. FIG. 2 is a schematic diagram of an existing relay system supporting multiple hops. As shown in FIG. 2, for RN1, DeNB is a parent node of RN1, RN2 is a child node of RN1, and for RN2, RN1 is a parent node of RN2, and UE is a child node of RN2.

The RN receives downlink data from the parent node and sends uplink data to the parent node on the backhaul link. In addition, the RN also sends downlink data to the child node and receives uplink data from the child node on the access link. Therefore, in the relay system, how to determine sending time of data is a very critical and important issue.

SUMMARY

In view of above problem, the present disclosure provides a synchronization method and apparatus for a relay system, computer device and storage medium.

Specific technical solutions are as follows.

A synchronization method for a relay system includes:
a relay node determines a first time slot boundary, and the relay node sends downlink data to a child node in a mode that a second time slot boundary of sending downlink data to the child node is time aligned with the first time slot boundary.

A synchronization method for a relay system includes:
a relay node determines a first timing advance according to at least the following information: a second timing advance for the relay node to send uplink data to a parent node and a transmission time delay between the relay node and a child node, and the relay node sends the first timing advance to the child node, wherein the first timing advance is used for the child node to determine sending time for sending uplink data to the relay node.

A synchronization method for a relay system includes:
a first device acquires a first timing advance, wherein the first timing advance is determined according to at least following information: a second timing advance for a second device to send uplink data to a third device and a transmission time delay between the second device and the first device, and the first device determines sending time for sending uplink data to the second device according to the first timing advance, wherein the second device is a parent node of the first device and the third device is a parent node of the second device.

A synchronization device for a relay system includes a time slot boundary determination unit and a downlink data sending unit.

Herein, the time slot boundary determination unit is configured to determine a first time slot boundary, and the downlink data sending unit is configured to send downlink data to a child node in a mode that a second time slot boundary of sending downlink data to the child node is time aligned with the first time slot boundary.

A synchronization device for a relay system includes a timing advance configuration unit.

The timing advance configuration unit is configured to determine a first timing advance according to at least the following information: a second timing advance of the synchronization device for the relay system to send uplink data to a parent node and a transmission time delay between the synchronization device for the relay system and a child node, and send the first timing advance to the child node, wherein the first timing advance is used for the child node to determine sending time for sending uplink data to the synchronization device for the relay system.

A synchronization device for a relay system includes a timing advance acquisition unit and an uplink data sending unit.

The timing advance acquisition unit is configured to acquire a first timing advance, wherein the first timing advance is determined according to at least the following information: a second timing advance for a second device to send uplink data to a third device and a transmission time delay between the second device and the synchronization device for the relay system, herein, the second device is a parent node of the synchronization device for the relay system, and the third device is a parent node of the second device.

The uplink data sending unit is configured to determine sending time for sending uplink data to the second device according to the first timing advance.

A computer device includes a memory, a processor and a computer program stored on the memory and executable on the processor, wherein the processor implements the methods as described above when executing the computer program.

A computer readable storage medium storing a computer program, when the computer program is executed by a processor, the above mentioned methods are implemented.

DETAILED DESCRIPTION

Concerning about the problems existing in the prior art, the present disclosure provides a synchronization solution for a relay system.

A communication system may be divided into a time division duplex (TDD) system and a frequency division duplex (FDD) system. The solution of the present disclosure is mainly implemented in a FDD system.

In an FDD system, downlink data transmissions of a backhaul link and an access link are all on downlink carriers, and uplink data transmissions of the backhaul link and the access link are all on uplink carriers. In a relay system, there are transmission time delays between an RN and a parent node (such as a DeNB or another RN) and between an RN and a child node (such as a UE or another RN). Assuming that a transmission time delay between the parent node and the RN is Tp1 and a transmission time delay between the RN and the child node is Tp2, that is, downlink data sent by the parent node to the RN arrives at the RN after the transmission time delay of Tp1, and downlink data sent by the RN to the child node arrives at the child node after the transmission time delay of Tp2.

To make technical solutions of the present disclosure more clearly understood, the solutions of the present disclosure will be further explained with reference to accompanying drawings and implementations.

It is apparent that the described implementations are a part, but not all, of implementations of the present disclosure. Based on the implementations of the present disclosure, all other implementations obtained by one of ordinary skill in the art without paying an inventive effort shall fall within the scope of the present disclosure.

Figure 3:
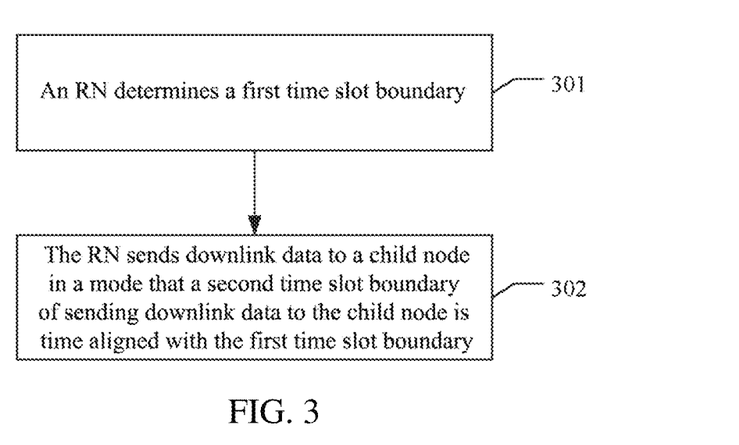
FIG. 3 is a flowchart of a synchronization method for a relay system according to a first implementation of the present disclosure.

FIG. 3 is a flowchart of a synchronization method for a relay system according to a first implementation of the present disclosure. As shown in FIG. 3, the synchronization method includes the following specific implementation.

In act 301, an RN determines a first time slot boundary.

In act 302, the RN sends downlink data to a child node in a mode that a second time slot boundary of sending downlink data to the child node is time aligned with the first time slot boundary.

In the implementation, the RN may determine the first time slot boundary in at least one of the following two modes, which are respectively described as follows.

1) Mode One

The RN may determine the first time slot boundary according to reception time of receiving downlink data sent by a parent node.

The RN may receive a synchronization signal from the parent node, determine reception time of the synchronization signal, and further determine the first time slot boundary according to the reception time of the synchronization signal and a predetermined offset, wherein the offset is a time offset between a position of the synchronization signal and the time slot boundary.

When the parent node wants to send downlink data to the RN, the parent node will first send a synchronization signal, and the position of the synchronization signal has a fixed offset relative to the time slot boundary. Upon receiving the synchronization signal, the RN may determine the first time slot boundary according to the reception time and the offset of the synchronization signal, i.e. synchronize with the parent node to acquire the first time slot boundary, and then receive the downlink data sent by the parent node according to the first time slot boundary.

2) Mode Two

The RN may determine the first time slot boundary according to reception time of receiving downlink data sent by the parent node and first switching time, wherein the first switching time includes time required for the RN to switch from receiving the downlink data sent by the parent node to sending downlink data to the child node.

Preferably, the RN may determine that the first time slot boundary is the reception time of receiving, by the RN, the downlink data sent by the parent node plus the first switching time.

No matter which mode above is adopted, after determining the first time slot boundary, the RN needs to ensure that the second time slot boundary of sending downlink data to the child node is time aligned with the first time slot boundary.

When sending downlink data to child nodes, the RN also needs to send a synchronization signal first. Since the second time slot boundary needs to be time aligned with the first time slot boundary, and an offset is a fixed value, the RN may determine a position of a synchronization signal and then send the synchronization signal accordingly.

In the above implementation, by making the time slot boundary of sending, by the RN, downlink data to the child node to be time aligned with the time slot boundary of receiving, by the RN, downlink data sent by the parent node, when resources of a backhaul link and an access link are multiplexed on a downlink carrier, only one symbol needs to be reserved as switching time for sending/receiving, and influence of a transmission time delay does not need to be considered. Moreover, the RN may further determine the first time slot boundary according to reception time of receiving the downlink data sent by the parent node and the first switching time, so that the RN does not need to reserve symbols as switching time for receiving/sending when sending the downlink data to the child node, thereby the system performance is further improved.

Figure 4:
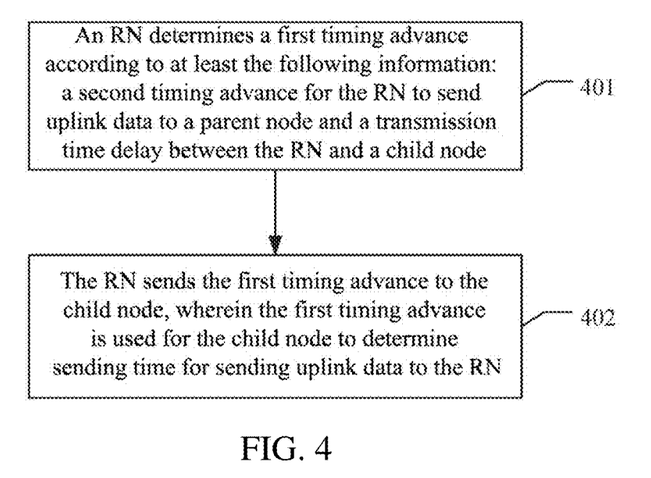
FIG. 4 is a flowchart of a synchronization method for a relay system according to a second implementation of the present disclosure.

FIG. 4 is a flowchart of a synchronization method for a relay system according to a second implementation of the present disclosure. As shown in FIG. 4, the synchronization method includes the following specific implementation.

In act 401, an RN determines a first timing advance according to at least the following information: a second timing advance for the RN to send uplink data to a parent node and a transmission time delay between the RN and a child node.

In act 402, the RN sends the first timing advance to the child node, wherein the first timing advance is used for the child node to determine sending time for sending uplink data to the RN.

In a relay system, a parent node may configure a Timing Advance (TA) for an RN to send data to the parent node according to the prior art. The timing advance is usually used for uplink transmission, i.e. sending data in advance by corresponding time according to an instruction.

In the implementation, by configuring the first timing advance of the child node, a time slot boundary of receiving, by the RN, uplink data from the child node and a time slot boundary of sending, by the RN, uplink data to the parent node may be time aligned.

The RN has already had a second timing advance when sending uplink data to the parent node, so when configuring a timing advance for the child node, i.e. the first timing advance, an additional advance is needed in addition to the second timing advance, which takes into account a time delay between the RN and the child node.

On the basis of the above, time required for switching of receiving/sending may be additionally considered, i.e., the RN may determine the first timing advance according to the following information: the second timing advance, the transmission time delay between the RN and the child node, and second switching time. The second switching time includes time required for the RN to switch from receiving uplink data sent by the child node to sending uplink data to the parent node.

The following is described with reference to FIG. 2. In FIG. 2, RN1 is a first-level relay node, DeNB is as parent node of RN1, RN2 is a child node of RN1, and RN2 is a second-level relay node, RN1 is a parent node of RN2, UE is a child node of RN2, a transmission time delay between RN1 and DeNB is Tp1, a transmission time delay between RN2 and RN1 is Tp2, and a transmission time delay between UE and RN2 is Tp3.

For RN1, DeNB determines a second timing advance TA2 for RN1. According to the prior art, a timing advance is usually determined by a transmission time delay, e.g. twice the transmission time delay, i.e. TA2 is twice Tp1. Moreover, TA2 may further include switching time Tsw, i.e. TA2=2*Tp1+Tsw.

RN1 determines a first timing advance TA1 for RN2. If switching time is considered, TA1 may be a sum of TA2 and a transmission time delay between RN and a child node and switching time, i.e., TA1=TA2+2*Tp2+Tsw.

In the above implementation, by configuring a timing advance for a child node, a time slot boundary of receiving, by the RN node, uplink data sent by the child node may be time aligned with a time slot boundary of sending, by the RN, uplink data to a parent node, such that when resources of a backhaul link and a access link are multiplexed on an uplink carrier, only one symbol needs to be reserved as switching time for sending/receiving, and influence of a transmission time delay does not need to be considered. Moreover, the RN may further consider switching time for receiving/sending when configuring the timing advance for the child node, so that the RN does not need to reserve a symbol as switching time for receiving/sending when sending uplink data to the parent node, and the system performance is further improved.

In a practical implementation, the modes shown in the two implementations of FIG. 3 and FIG. 4 may be implemented separately or in combination.

Besides, in the above description, a processing on the RN side is mainly taken as an example to explain the solution of the present disclosure, and a processing on a child node side will be described below.

A first device acquires a first timing advance, wherein the first timing advance is determined according to at least following information: a second timing advance for a second device to send uplink data to a third device and a transmission time delay between the second device and the first device, and the first device determines sending time for sending uplink data to the second device according to the first timing advance.

Herein, the second device is a parent node of the first device, and the third device is a parent node of the second device. For example, the second device may be an RN, the first device is a child node of the RN, which may be a UE or another RN, and the third device may be a parent node of the RN, may be a DeNB or another RN.

The above information may further include second switching time. The second switching time includes time required for the second device to switch from receiving uplink data sent by the first device to sending uplink data to the third device. That is, the first timing advance may be determined according to the second timing advance that the second device sends uplink data to the third device, a transmission time delay between the second device and the first device, and the second switching time.

The first device may acquire the first timing advance from the second device. Specifically, the first device may receive broadcast information, Radio Resource Control (RRC) information or control information from the second device. The broadcast information, the RRC information or the control information carries the first timing advance.

Figure 5:
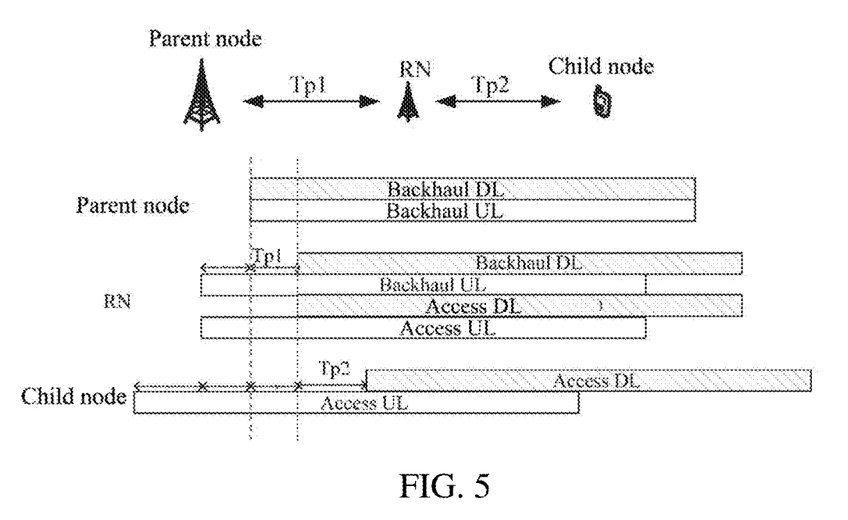
FIG. 5 is a schematic diagram of a relay system according to the present disclosure.

Based on the above description, FIG. 5 is a schematic diagram of a relay system according to the present disclosure. As shown in FIG. 5, a transmission time delay between a parent node and an RN is Tp1, a transmission time delay between the RN and a child node is Tp2. A second timing advance is used for the RN to send uplink data to the parent node, which may be twice Tp1, and a first timing advance is used for the child node to send uplink data to the RN, which may be a sum of twice Tp1 and twice Tp2.

Figure 6:
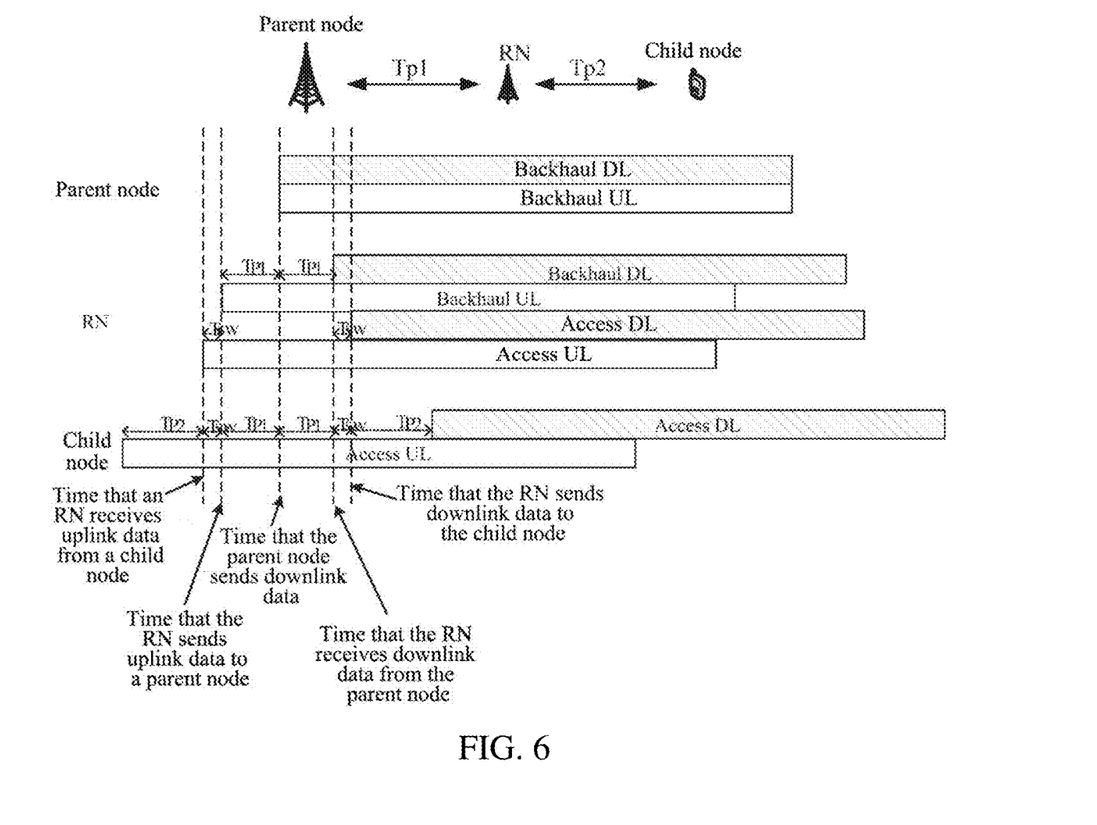
FIG. 6 is a schematic diagram of another relay system according to the present disclosure.

FIG. 6 is a schematic diagram of another relay system according to the present disclosure. As shown in FIG. 6, a transmission time delay between a parent node and an RN is Tp1, a transmission time delay between the RN and a child node is Tp2, and switching time is Tsw. A second timing advance is used for the RN to send uplink data to the parent node, which may be twice Tp1. Moreover, if the switching time is considered, the second timing advance may be twice Tp1 plus Tsw, and a first timing advance is used for the child node to send uplink data to the RN, which may be the second timing advance plus twice Tp2 and Tsw.

It should be noted that for sake of conciseness, the above-mentioned method implementations are all expressed as a series of action combinations, but one skilled person in the art should know that the present disclosure is not limited by the described sequence of acts, since according to the present disclosure, some acts may be performed with other sequences or simultaneously. Secondly, one skilled person in the art should also know that the implementations described in the specification are all preferred implementations, and the actions and modules involved are not always necessary for the present disclosure.

In the above implementations, there is respective emphasis in description of each implementation. For a part not detailed in an implementation, related description in other implementations may be referred to.

The above is the description of method implementations, and the solution of the present disclosure will be further described below by apparatus implementations.

Figure 7:
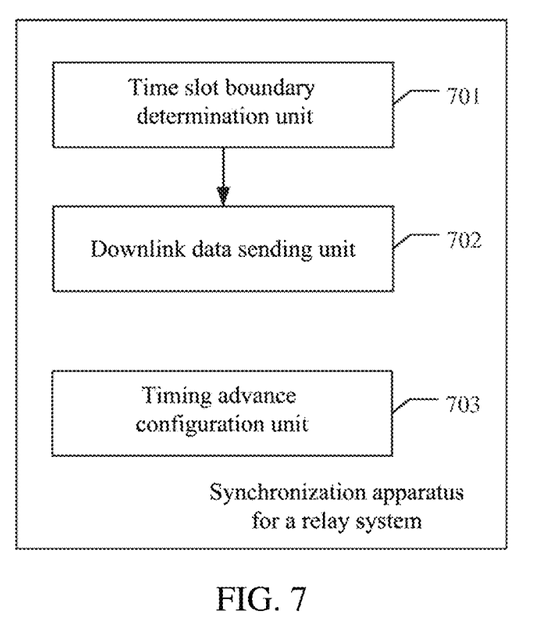
FIG. 7 is a schematic diagram of structural of a synchronization device for a relay system according to a first implementation of the present disclosure.

FIG. 7 is a schematic diagram of structure of a synchronization device for a relay system of a first implementation according to the present disclosure. As shown in FIG. 7, the synchronization device includes a time slot boundary determination unit 701 and a downlink data sending unit 702, or a timing advance configuration unit 703, or a time slot boundary determination unit 701, a downlink data sending unit 702, and a timing advance configuration unit 703, and preferably includes all of the three units.

The time slot boundary determination unit 701 is configured to determine a first time slot boundary.

The downlink data sending unit 702 is configured to send downlink data to a child node in a mode that a second time slot boundary of sending downlink data to the child node is time aligned with the first time slot boundary.

Herein, the time slot boundary determination unit 701 may determine the first time slot boundary according to reception time of receiving downlink data sent by a parent node. Specifically, the time slot boundary determination unit 701 may receive a synchronization signal from the parent node, determine reception time of the synchronization signal, and determine the first time slot boundary according to the reception time of the synchronization signal and a predetermined offset, wherein the offset is the time offset between a position of the synchronization signal and the time slot boundary.

The time slot boundary determination unit 701 may further determine the first time slot boundary according to the reception time of receiving the downlink data sent by the parent node and first switching time, wherein the first switching time includes time required for the synchronization device for the relay system to switch from receiving the downlink data sent by the parent node to sending downlink data to the child node.

Preferably, the time slot boundary determination unit 701 may determine that the first time slot boundary is the reception time of receiving, by the synchronization device for the relay system, the downlink data sent by the parent node plus the first switching time.

The timing advance configuration unit 703 is configured to determine a first timing advance according to at least the following information: a second timing advance of sending, by the synchronization device for the relay system, uplink data to the parent node and a transmission time delay between the synchronization device for the relay system and the child node, and send the first timing advance to the child node, wherein the first timing advance is used by the child node to determine sending time for sending uplink data to the synchronization device for the relay system.

The information may further include second switching time. The second switching time includes time required for the synchronization device for the relay system to switch from receiving uplink data sent by the child node to sending uplink data to the parent node.

In a practical implementation, the synchronization device for the relay system shown in FIG. 7 may be the RN described above.

Figure 8:
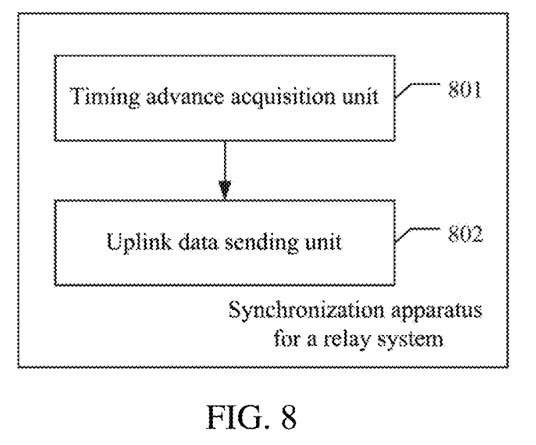
FIG. 8 is a schematic diagram of structural of a synchronization device for a relay system according to a second implementation of the present disclosure.

FIG. 8 is a schematic diagram of structure of a synchronization device for a relay system according to a second implementation of the present disclosure. As shown in FIG. 8, the synchronization device includes a timing advance acquisition unit 801 and an uplink data sending unit 802.

The timing advance acquisition unit 801 is configured to acquire a first timing advance, wherein the first timing advance is determined according to at least the following information: a second timing advance for a second device to send uplink data to a third device and a transmission time delay between the second device and the synchronization device for the relay system. The second device is a parent node of the synchronization device for the relay system, and the third device is a parent node of the second device.

The uplink data sending unit 802 is configured to determine sending time for sending uplink data to the second device according to the first timing advance.

The information may further include second switching time. The second switching time includes time required for the second device to switch from receiving uplink data sent by the synchronization device for the relay system to sending uplink data to the third device.

In addition, the timing advance acquisition unit 801 may acquire the first timing advance from the second device. Specifically, broadcast information, RRC information or control information from the second device may be received, and the broadcast information, the RRC information or the control information carries the first timing advance.

In a practical implementation, the synchronization device for the relay system shown in FIG. 8 may be the above-mentioned child node.

Please refer to the corresponding description in the above method implementations for specific work flows of each of the above device implementations, which are not repeated herein.

Figure 9:
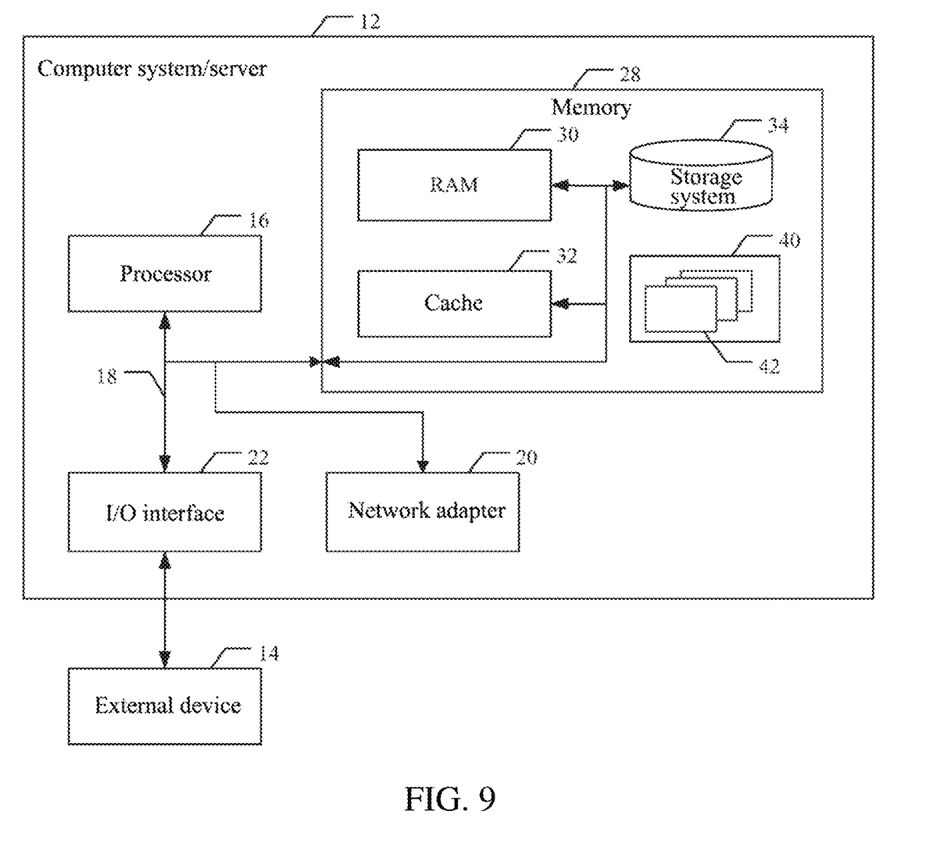
FIG. 9 shows a block diagram of an exemplary computer system/server 12 suitable for implementing implementations of the present disclosure.

FIG. 9 shows a block diagram of an exemplary computer system/server 12 suitable for implementing implementations of the present disclosure. The computer system/server 12 shown in FIG. 9 is only an example and should not impose any restriction on functions and scope of usage of the implementations of the present disclosure.

As shown in FIG. 9, the computer system/server 12 is represented in a form of a general-purpose computing device. Components of the computer system/server 12 may include, but are not limited to, one or more processors (processing units) 16, a memory 28, and a bus 18 connecting different system components (including the memory 28 and the processor 16).

The bus 18 represents one or more of several types of bus structures, including a memory bus or a memory controller, a peripheral bus, a graphics acceleration port, a processor, or a local bus using any of a variety of bus structures. For example, these architectures include, but are not limited to, Industry Standard Architecture (ISA) bus, Micro Channel Architecture (MAC) bus, Enhanced ISA bus, video electronics standards association (VESA) local bus, and Peripheral Component Interconnect (PCI) bus.

The computer system/server 12 typically includes a variety of computer system readable media. These media may be any available media that can be accessed by the computer system/server 12, including transitory and non-transitory media, removable and non-removable media.

The memory 28 may include computer system readable media in a form of transitory memory, such as a random access memory (RAM) 30 and/or a cache memory 32. The computer system/server 12 may further include other removable/non-removable, transitory/non-transitory computer system storage media. By way of example only, a storage system 34 may be configured to read and write non-removable, non-transitory magnetic media (not shown in FIG. 9, commonly referred to as a "hard disk drive"). Although not shown in FIG. 9, a magnetic disk driver for reading from and writing into a removable non-transitory magnetic disk (e.g., "floppy disk") and an optical disk driver for reading from and writing into a removable non-transitory optical disk (e.g., CD-ROM, DVD-ROM or other optical media) may be provided. In these cases, each driver may be connected to the bus 18 through one or more data media interfaces. The memory 28 may include at least one program product having a group (e.g., at least one) of program modules configured to perform functions of various implementations of the present disclosure.

A program/utility 40 having a group (at least one) of program modules 42 including, but not limited to, an operating system, one or more application programs, other program modules, and program data may be stored in, for example, the memory 28, and an implementation of a network environment may be included in each or some combination of these examples. The program module 42 generally performs functions and/or methods in the implementations described according to the present disclosure.

The computer system/server 12 may also communicate with one or more external devices 14 (e.g., a keyboard, a pointing device, a display 24, etc.), with one or more devices that enable a user to interact with the computer system/server 12, and/or with any device (e.g., a network card, a modem, etc.) that enables the computer system/server 12 to communicate with one or more other computing devices. This communication may be through an input/output (I/O) interface 22. Furthermore, the computer system/server 12 may also communicate with one or more networks (e.g., a local area network (LAN), a wide area network (WAN) and/or a public network, e.g., the internet) through a network adapter 20. As shown in FIG. 9, the network adapter 20 communicates with other modules of the computer system/server 12 via the bus 18. It should be understood that although not shown in the figure, other hardware and/or software modules may be used in conjunction with the computer system/server 12, including but not limited to microcode, a device driver, a redundant processing unit, an external disk drive array, a RAID system, a tape drives, a data backup storage system, etc.

The processor 16 executes various functional applications and data processing by running programs stored in the memory 28, such that implementing the method in the implementation shown in FIG. 3 or FIG. 4.

The present disclosure further discloses a computer readable storage medium on which a computer program is stored, when the computer program is executed by a processor, the method in the implementation shown in FIG. 3 or FIG. 4 will be implemented.

Any combination of one or more computer readable media may be employed. The computer readable medium may be a computer readable signal medium or a computer readable storage medium. The computer readable storage medium may be, for example, but not limited to, an electrical, magnetic, optical, electromagnetic, infrared, or semiconductor system, apparatus, or device, or any combination thereof. Examples of computer readable storage media (a non-exhaustive list) include: electrical connections with one or more wires, portable computer disks, hard disks, random access memory (RAM), read only memory (ROM), erasable programmable read only memory (EPROM or flash memory), optical fibers, portable compact disk read only memory (CD-ROM), optical storage devices, magnetic storage devices, or any suitable combination of the above. In this disclosure, a computer readable storage medium may be any tangible medium containing or storing a program that may be used by or in connection with an instruction execution system, apparatus, or device.

The computer readable signal medium may include data signals propagated in baseband or as part of a carrier, in which computer readable program codes are carried. Such propagated data signals may take many forms, including, but not limited to, electromagnetic signals, optical signals, or any suitable combination of the above. The computer-readable signal medium may also be any computer-readable medium in addition to a computer-readable storage medium, which may be used for sending, propagating, or transmitting programs used by or in connection with an instruction execution system, apparatus, or device.

Program code contained on a computer readable medium may be transmitted using any suitable medium, including, but not limited to, wireless, wire, fiber optic cable, RF, etc., or any suitable combination thereof.

Computer program code for performing the operations of implementations of the present disclosure may be written in one or more programming languages or combinations thereof, including object-oriented programming languages such as Java, SmallTalk, C++, as well as conventional procedural programming languages such as "C" or similar programming languages. The program code may be executed entirely on the user computer, partially on the user computer, and as a separate software package, partially on the user computer, partially on the remote computer, or entirely on the remote computer or server. In the case of a remote computer, the remote computer may be connected to the user computer through any kind of network, including a local area network (LAN) or a wide area network (WAN), or may be connected to an external computer (e.g., via the internet using an internet service provider).

In several implementations provided by the present disclosure, it should be understood that the disclosed apparatuses and methods may be implemented in other ways. For example, the apparatus implementations described above are just exemplary. For example, division of units is just division according to logical functions, and other division mode may be adopted during an actual implementation.

The unit described as a separate component may or may not be physically separated, and the component shown as a unit may or may not be a physical unit, i.e., it may be located in one place or may be distributed over multiple network units. Some or all of the units may be selected according to actual needs to achieve the purpose of the implementations.

In addition, various functional units in various implementations of the present disclosure may be integrated in one processing unit, or the various units may be physically present separately, or two or more units may be integrated in one unit. The integrated units can be implemented in the form of hardware or in the form of hardware plus software functional units.

The integrated units implemented in the form of software functional units may be stored in a computer readable storage medium. The above-mentioned software functional units are stored in a storage medium including several instructions for causing a computer device (which may be a personal computer, a server, or a network device and so on) or a processor to perform parts of acts of the methods described in various implementations of the present disclosure. The aforementioned storage medium includes a medium capable of storing program codes, such as, a U disk, a mobile hard disk, a read-only memory (ROM), a magnetic disk or an optical disk, etc.

The above description is only exemplary implementations of the present disclosure, and is not intended to limit the present disclosure. Any modification, equivalent substitution, improvement and the like made within the spirit and principle of the present disclosure shall be included in the scope of protection of the present disclosure.

What is claimed is:

1. A synchronization method for a relay system, comprising:
   determining, by a relay node, a first time slot boundary according to reception time of a synchronization signal sent by a parent node and a predetermined offset, wherein the predetermined offset is a time offset between reception time of the synchronization signal and the first time slot boundary;
   sending, by the relay node, downlink data to a child node in a mode that a second time slot boundary of sending downlink data to the child node is time aligned with the first time slot boundary.

2. The method of claim 1, further comprising:
   determining, by the relay node, a first timing advance according to at least following information: a second timing advance for the relay node to send uplink data to a parent node and a transmission time delay between the relay node and a child node;
   sending, by the relay node, the first timing advance to the child node, wherein the first timing advance is used for the child node to determine sending time for sending uplink data to the relay node.

3. The method of claim 1, wherein determining, by the relay node, the first time slot boundary comprises:
   determining, by the relay node, the first time slot boundary further according to first switching time, wherein the first switching time comprises time required for the relay node to switch from receiving downlink data sent by the parent node to sending the downlink data to the child node.

4. The method of claim 3, wherein the first time slot boundary is the reception time of the synchronization signal sent by the parent node plus the first switching time and the first switching time.

5. A synchronization device for a relay system, comprising: a processor and a network adapter; wherein
   the processor is configured to determine a first time slot boundary according to reception time of a synchronization signal sent by a parent node and a predetermined offset, wherein the predetermined offset is a time offset between reception time of the synchronization signal and the first time slot boundary;
   the network adapter is configured to send downlink data to a child node in a mode that a second time slot boundary of sending downlink data to the child node is time aligned with the first time slot boundary.

6. The synchronization device for the relay system of claim 5, wherein
   the processor is configured to determine a first timing advance according to at least following information: a second timing advance for sending, by the synchronization device for relay system, uplink data to a parent node, and a transmission time delay between the synchronization device for the relay system and the child node, and send the first timing advance to the child node, wherein the first timing advance is used for the child node to determine sending time for sending uplink data to the synchronization device for the relay system.

7. The synchronization device for the relay system of claim 5, wherein
   the processor is configured to determine the first time slot boundary further according to first switching time, wherein the first switching time comprises time required for the synchronization device for the relay system to switch from receiving downlink data sent by the parent node to sending the downlink data to the child node.

8. The synchronization device for the relay system of claim 7, wherein
   the processor is configured to determine the first time slot boundary according to reception time of the synchronization signal sent by the parent node and the predetermined offset, plus the first switching time and the first switching time.

9. A non-transitory computer-readable storage medium, wherein a computer program is stored in the non-transitory computer-readable storage medium, when the computer program is executed by a processor, the method of claim 1 is implemented.

10. A synchronization method for a relay system, comprising:
    determining, by a relay node, a first time slot boundary according to reception time of a synchronization signal sent by a parent node and first switching time, wherein the first switching time comprises time required for the relay node to switch from receiving downlink data sent by the parent node to sending the downlink data to the child node; wherein the first time slot boundary is the reception time of the synchronization signal sent by the parent node plus the first switching time;
    sending, by the relay node, downlink data to a child node in a mode that a second time slot boundary of sending downlink data to the child node is time aligned with the first time slot boundary.

11. The method of claim 10, wherein determining, by the relay node, the first time slot boundary further comprises:
    determining, by the relay node, the first time slot boundary further according to a predetermined offset; wherein the predetermined offset is a time offset between the reception time of the synchronization signal and the first time slot boundary; wherein the first time slot boundary is the reception time of the synchronization signal sent by the parent node plus the first switching time and the predetermined offset.

* * * * *